C. DODGE.

Fireplace.

No. 2,698. Reissued July 23, 1867.

Witnesses.

G. McLee

W. Varnatta

N. PETERS, Photo-Lithographer, Washington, D. C.

United States Patent Office.

JOHN B. RYAN, OF CINCINNATI, OHIO, ASSIGNEE OF CALVIN DODGE.

*Letters Patent No.* 14,447, *dated March* 18, 1856; *reissue No.* 2,698, *dated July* 23, 1867.

FIRE-PLACE.

The Schedule referred to in these Letters Patent and making part of the same.

TO ALL WHOM IT MAY CONCERN:

Be it known that CALVIN DODGE, of the city of Pittsburg, in the county of Allegheny, and State of Pennsylvania, invented a new and useful improvement in the Mode of Constructing Open Fire-Places, of which the following is a full, clear, and exact description, reference being had to the accompanying drawings, forming part of this specification, in which—

In open fire-places as ordinarily constructed a great waste of heat, and consequently of fuel, arises from the fact that a large proportion of the heat of the fire passes up the chimney and is lost, and that the smoke and gas, which contain a large proportion of the combustible portion of the coal, instead of being burned and emitting a great amount of heat, also pass up the chimney, so that the radiation of the heat into the room is in a great measure checked. In addition to this waste, the ordinary construction of fire-places creates a great draught or current of cold air through the room towards the fire and up the chimney, so that the radiation of heat into the room is in a great measure checked. This invention is designed to remedy all these evils by suppressing the draught of cold air through the room, consuming a great proportion of the smoke and gas, thus producing large bodies of flame, and by deflecting into the room a great quantity of heat, which, instead of being drawn back again by meeting a current of cold air, is diffused through the apartment.

To enable others skilled in the art to make and use this invention, the following is a description of its construction and operation.

This invention may be applied to open fire-places of any usual shape, not requiring any alteration in the grate itself.

Figure 1:
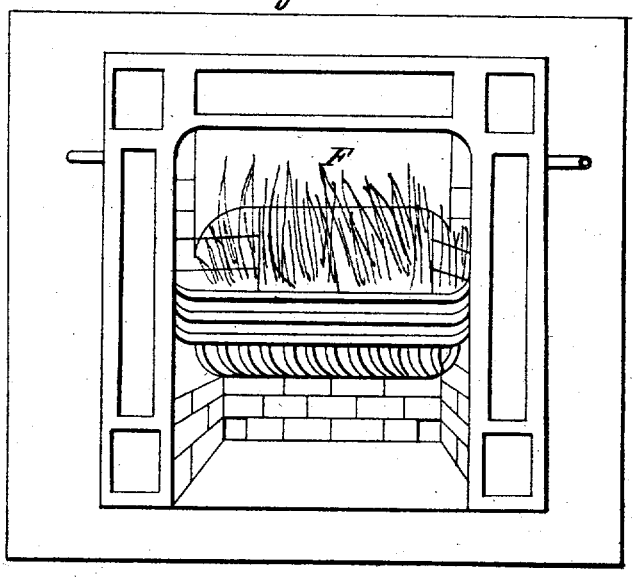
Figure 1 is a front view of a fire-place constructed according to his improved plan.
Figure 2:
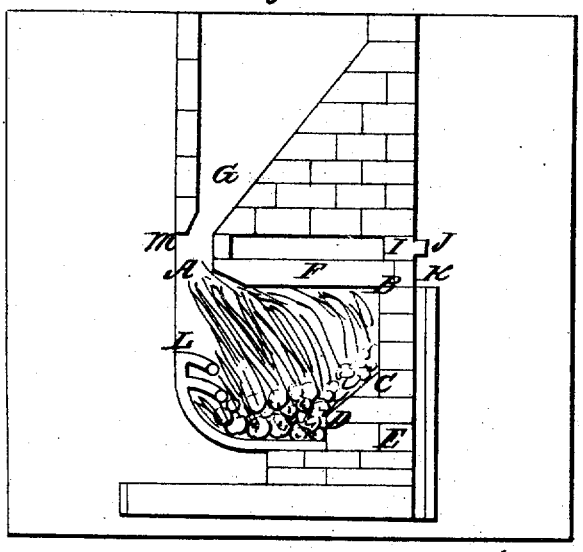
Figure 2 is a transverse sectional elevation thereof.

In the drawing, fig. 2, L is the basket of the grate. D is the base of the back wall as ordinarily constructed. G is the throat of the chimney. A straight line drawn from A to D represents the face of the back wall of a fire-place built on the Rumford principle as now generally in use, only that the throat G being narrower, the slope is rather greater than usually adopted. Instead of sloping the wall thus from D to A, it may, in carrying out this invention, be sloped backward from D to a point nearly level with L, the top of the fire-basket, or carried back horizontally on a level a little above the bottom of the ordinary fire-basket of the grate, making the recess extend from six to eighteen inches back from the point A. This recess or fire-chamber is not formed by the extension of the bars of the fire-basket backwards, as it is important that no air should enter this recess from below, which would create a draught, and produce too rapid a combustion of the fuel. From C to B the back wall is perpendicular, the point B being so little above the fire-basket L that the flame and smoke of the fire will play against the covering F, which may be of fire-brick or iron, the former being preferred. This covering F projects horizontally or archwise from near the side walls over the recess and fire-basket to within two or three inches of the outer line of the throat of the chimney, and is made of any shape which will catch the flame and smoke and give them a downward tendency. The wall is then built perpendicularly or slightly inclining forward until the throat of the chimney is confined to a width at G of from three-quarters of an inch to three inches, as the natural draught of the flue may require; and the front of the wall A should meet the lower surface of the covering F at a right angle, the chamfer on the front of F being unnecessary. The perpendicular wall presents a considerable blank surface below the throat of the chimney, and within a few inches of the front of the grate, before which the flame must pass on its way to the chimney.

If desired, the flue for heated air may be placed above the covering F at I, which may be conducted by pipes into the same or an adjoining room; but this I do not claim as new, and it does not form a necessary part of my invention. An aperture, K, in the back wall, just below the level of the covering F, may be made to admit a current of oxygen to aid in the combustion of the smoke and gas generated in the fire recess, but is not necessary.

The above-described construction may be regarded as a type of the improvement, and it is found in experience to accomplish the ends sought to be attained.

When there is fire in the grate, and it is desired to add more fuel, the coal in the recess, which is in a great measure converted into coke, is drawn forward into the basket of the grate, and the fresh coal or slack thrown back into the recess. The gas, smoke, and flame emitted by the fresh coal strike against the covering F, which is very hot, and, reverberating against it, are thrown forward, and in a great measure consumed by the hot fire in front. The fuel in the recess being entirely out of the reach of the draught consumes slowly, but as there is no chimney immediately above it to carry off all the heat that passes forward, it is deflected by the covering F downward and outward into the room. The flame having no other exit passes slowly forward, and then is carried up the chimney as near as possible to the front of the fire-place, so as to throw the greatest possible portion of the heat into the room. Care must be taken to have the covering F low enough for the flame to reverberate against it, as it will not answer the purpose unless the roof covers the fire, and the flame plays against it. It should therefore be raised from four to seven inches above the top bar of the fire-basket L.

A distinct feature of this invention, and one which is not fully brought out and covered in the original patent, is the arrangement above the grate of a reverberating covering, F, whose forward edge occupies a position below the breast *m* of the chimney. This covering retards the passage of the products of combustion into the chimney for a sufficient length of time to insure the complete ignition of all the combustible matter, and, being below the breast *m*, as represented, it gives the heat an outward tendency, and causes a large percentage to be delivered into the room.

The practical test of this mode of construction has proved it in all the many instances in which it has been tried to be extremely advantageous, and to have accomplished all that has been stated. In its construction it is entirely independent of the shape, size, or kind of grate used in any open fire-place, and may be applied to any open fire-place without altering or removing the grate or mantel. It is also entirely dissimilar in its construction and operation from any arrangement of dampers or cowls, such as have heretofore been attempted to be used for suppressing the draught at the expense of deadening the fire, and often causing the chimney to smoke.

I do not claim the contracting the vent or throat of the chimney, as that is well known as a device; but what is claimed as this invention, and desired to be secured by Letters Patent, is—

1. The use of a deep recess or fire-chamber, placed back of the fire-basket of the grate, and out of the reach of the draught, in combination with the horizontal covering over the recess and fire-basket, extending down below the mouth of the chimney, constructed and arranged, substantially as heretofore described, for the purpose of consuming the smoke and causing the ignition of the gas, which would otherwise be lost, and thus increasing the amount of heat thrown into the room, and, by the slow combustion of the fire, effecting a great saving of fuel.

2. The arrangement in a fire-place above the grate of a reverberating covering, F, extending forward from the rear wall of the fire-chamber to a point below the breast of the chimney, and employed to retard the products of combustion and direct the heat into the room, substantially as described.

JOHN B. RYAN.

Witnesses:

GEORGE M. LEE,

WELLINGTON VANNATTA.